Oct. 7, 1952      J. BAUM      2,613,051
MOUNTING MEANS FOR TUBULAR MEMBERS
Filed Dec. 23, 1947
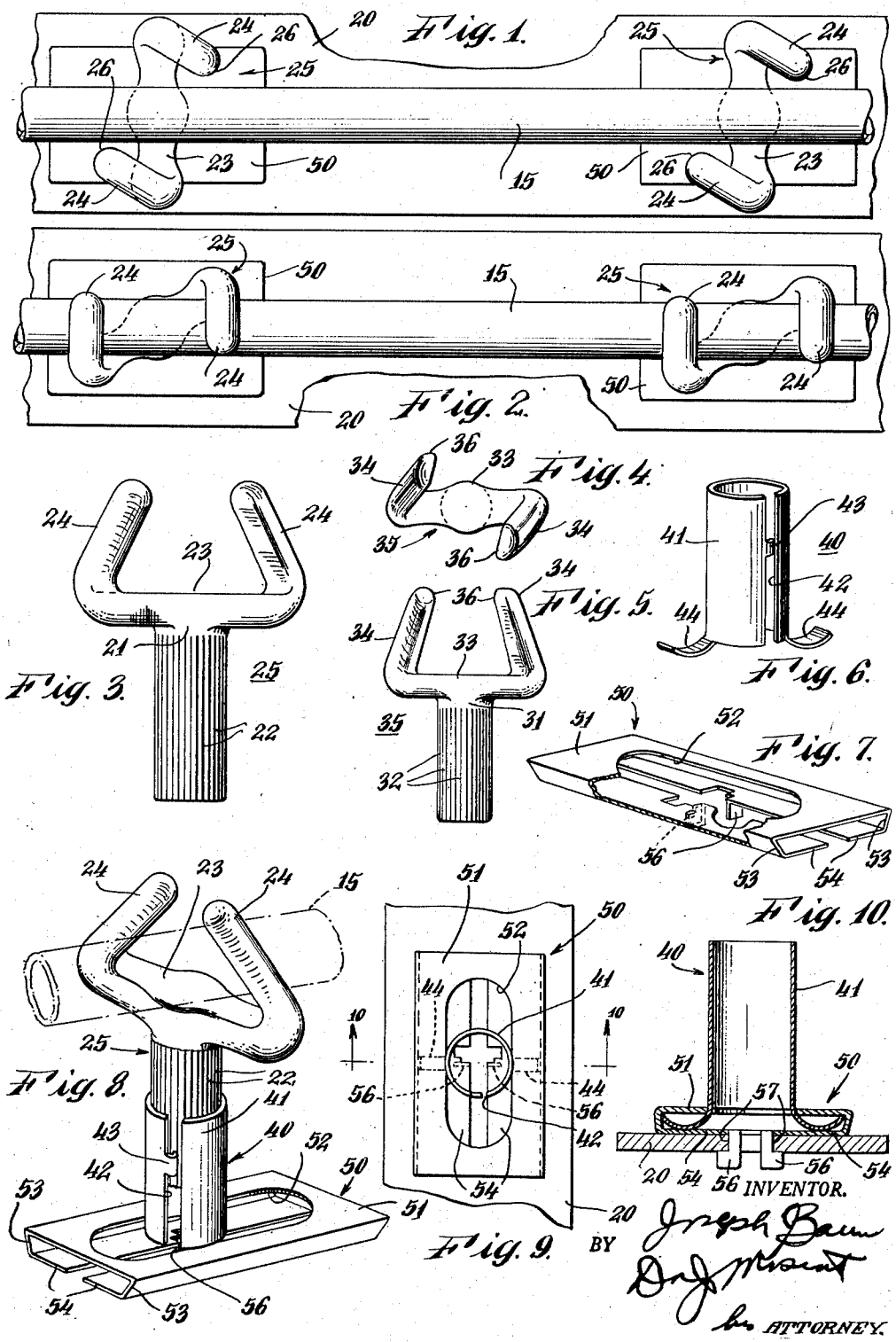

Patented Oct. 7, 1952

2,613,051

UNITED STATES PATENT OFFICE 2,613,051

MOUNTING MEANS FOR TUBULAR MEMBERS

Joseph Baum, New York, N. Y.

Application December 23, 1947, Serial No. 793,443

1 Claim. (Cl. 248—50)

This invention relates to mounting means for tubular members, such as electrically energized luminous tubing used in advertising signs and the like. More particularly it relates to a novel elevation post for such tubing and a novel supporting arrangement for the post.

Such elevation posts generally comprise a member of insulating material having a shank portion, for mounting on a signboard or the like, and a seat portion for supporting the tubing in spaced relation to the mounting board. The shank portion is arranged to adjustably seat in a socket member mounted on the mounting board, signboard or the like. The seat portion is either recessed or provided with fingers to at least partly embrace the tubing.

Various means are used to secure the tubing to the seat portion. Most frequently, the tubing is wired or taped to the seat, although it has been proposed to make the fingers of deformable plastic material so that they may be molded around the tubing and then allowed to set. In either case, securing the tubing in place on the posts is a time consuming, relatively expensive operation.

In accordance with the present invention, these disadvantages are obviated by providing inwardly converging fingers extending from the ends of the seat. The fingers have their inner ends separated by a distance at least slightly in excess of the diameter of the tubing to be mounted. Accordingly, in one position of the post, tubing may be inserted between the finger ends to rest on the seat. If the tubing is held stationary and the post rotated on its shank axis, the fingers will clampingly embrace the tubing and the distance between the finger ends, measured diametrically of the tubing, will be less than the tubing diameter. Consequently, the tubing is locked on the seat merely by twisting the supporting posts about the axes of their shanks.

Another feature of the invention is the provision of an improved mounting means for the elevation posts. This comprises a box-shaped bracket having a pair of parallel walls, one of which is provided with flexible ears or the like to interlock in an aperture or slot in a mounting board, and the other of which is provided with an elongated slot. The post receiving socket has oppositely projecting radial spring ears at one end. These ears are aligned in the bracket slot and then the socket is turned to engage the ears beneath the slotted wall. The socket is adjustable along the slot for accurate positioning and provides for freedom of movement to accommodate tubing adjustments. Preferably the shank of the elevation post is longitudinally fluted, and interlocking means, such as a flexible tab on the socket engageable with the fluting, are provided to prevent relative rotation of the post and socket after adjustment.

Accordingly, it is among the objects of this invention to provide an improved, self-locking mounting for luminous tubing or the like.

Another object is to provide improved self-locking elevation posts for luminous tubing.

A further object is to provide a novel and simple adjustable support for the mounting sockets of luminous tubing elevation posts.

These and other objects, advantages and novel features of the invention will be apparent from the following description and the accompanying drawing. In the drawing:

Fig. 1 is a plan view illustrating a pair of mounting posts, according to the present invention, in the unlocked, or tubing receiving position.

Fig. 2 is a view similar to Fig. 1 showing the posts in the tubing locking position.

Fig. 3 is an elevation view of one of the posts shown in Figs. 1 and 2.

Fig. 4 is a plan view of a modified form of mounting post.

Fig. 5 is an elevation view of the modified form of post shown in Fig. 4.

Fig. 6 is a perspective view of an improved mounting socket for an elevation post.

Fig. 7 is a perspective view of a socket mounting bracket.

Fig. 8 is a perspective view of the socket of Fig. 6 secured to the mounting bracket of Fig. 7.

Fig. 9 is a plan view of the socket and mounting bracket.

Fig. 10 is a transverse sectional view on the line 10—10 of Fig. 9.

In the drawings, the invention is shown as embodied in a support for luminous tubing, such as used in illuminated advertising signs and the like. Referring more particularly to Figs. 1, 2 and 3, a section of luminous tubing 15 is shown mounted on a supporting background, for example a signboard 20. In accordance with the usual practice of the art, tubing 15 is supported or elevated in spaced, insulated relation to signboard 20. The present invention is directed to novel elevation posts, and mounting means therefor, for so supporting tubing 15 in spaced relation to signboard 20.

The form of elevation post 25 shown in Figs. 1, 2 and 3 is made of a suitable dielectric, such as glass, for example, and includes a substantially cylindrical shank 21 having longitudinal fluting 22. Shank 21 merges with a transversely or diametrically extending tubing seat 23, which is substantially flat on its upper or outer surface and has a length substantially greater than the diameter of tubing 15.

Extending from the ends of seat 23 are a pair of fingers 24 which converge inwardly toward each other. Each finger 24 is curved inwardly to extend toward the other finger 24 at an angle to the direction of seat 23, with one finger diverging outwardly on each side of the seat.

Referring to Fig. 1, it will be noted that the space between the inner ends 26 of fingers 24, measured parallel to seat 23, is greater than the diameter of tubing 15. Consequently, when posts 25 are positioned so that seats 23 extend perpendicularly to tubing 15, a piece of tubing can be inserted between the ends 26 of fingers 24, as shown in Fig. 1. However, if posts 25 are now rotated about the axes of their shanks 21 to the position shown in Fig. 2, fingers 24 embrace tubing 15. In the position of Fig. 2, the distance between ends 26 of fingers 24, measured diametrically of tubing 15, is less than the tubing diameter. Consequently, such rotation of posts 25 locks tubing 15 onto seats 23.

A modified form of post is shown in Figs. 4 and 5. In these fingers, post 35 has a shank 31, with longitudinal fluting 22, and a seat 33. Fingers 34, in this case, are rectilinear and not curved. However, fingers 34 extend toward each other and the spacing between their inner ends 36, measured along seat 33, is greater than the diameter of tubing 15. Similarly, when post 35 is rotated relative to tubing 15, in the same manner as post 25 of Figs. 1, 2 and 3, the distance between the ends 36 of its fingers 34, measured diametrically of tubing 15, will be less than the tubing diameter. Thus, fingers 34 will embrace the tubing and lock it on seat 33. In both forms of posts 25, 35, the tubing 15 is locked in seated relation simply by twisting the posts about the axes of their shanks.

In further accordance with the invention, a novel mounting arrangement is provided for the elevation posts. Such mountings have customarily comprised a shank fitting socket, suitably secured to the signboard, and in which the shank of the elevation post is clamped. The prior art post mounting arrangements have been unsatisfactory from an adjustment standpoint, as the sockets have been secured directly to the signboard by nails, screws, or other fastening means. Consequently, it has been difficult or impossible to make slight positional adjustments of the elevation posts to accommodate misalignments of luminous tubing.

To overcome these difficulties, the present invention provides a novel socket 40 adjustably mounted on a bracket 50 which is, in turn, adjustably securable to signboard 20. Socket 40 includes a cylindrical, shank fitting portion 41 having a longitudinal slit 42. A tab 43 projects from portion 41 into slit 42 to engage the fluting on the elevation post and prevent rotation of the latter after it is adjusted on tubing 15 and set into socket 40. Alternatively, one or more internal ribs can be formed in the metal of socket 40. For a purpose to be described, a pair of oppositely projecting spring fingers 44 project radially from the lower end of socket 40.

Socket 40 is adjustably mounted on bracket 50. The latter is generally an inverted trapezoid in cross-section and comprises an upper flat wall 51 having a longitudinal slot 52 therein. A pair of narrow side walls 53, 53 extend downwardly and inwardly from wall 51, being continued in lower wall sections 54, 54 extending toward each other and parallel to wall 51. A tab 56 is cut from the inner edge of each wall section 54, and bent downwardly at right angles thereto, with each tab being notched as at 57.

In assembling the mounting, tabs 56 are inserted through a slot or the like in board 20. Since the tabs 56 are flexible, and each incorporates a notch 57, only small metal necks join the tabs to wall sections 54. Consequently, it is possible to twist bracket 50 to some extent about the slot in board 20, for adjustment purposes.

Socket 40 is secured to bracket 50 by aligning spring fingers 44 with slot 52 and pressing the fingers into the slot. Socket 40 is then turned 90° to engage fingers 44 beneath wall 51 and against walls 53 to lock the socket to bracket 50. The socket may then be adjusted along slot 52 as desired. Since the walls 53 of bracket 50 are spread by fingers 44 in their angular displacement, the tabs 56 are simultaneously spread apart, thereby locking the bracket firmly to the board 20 (see Figs. 7 and 10).

To complete the assembly of tubing 15 to base 20, elevation posts 25 or 35 are locked to embrace tubing 15, as desired, and then set into sockets 40. Tabs 43 being flexible and inwardly bent, engage the shank flutings and lock the posts against rotation. Tubing 15 is thus locked easily and securely to signboard 20 without the use of wires or a molding procedure.

The invention thus provides a novel elevation post for luminous tubing to which the tubing may be secured against displacement merely by rotation of the post about the axis of its shank. Additionally, a novel adjustable mounting for the socket receiving the post shank has been provided, by means of which misalignment of the tubing may be easily accommodated. No wires are necessary to secure the tubing to the elevation posts and the mounting of the tubing becomes a simple operation not requiring the use of special tools.

While specific embodiments of the invention have been shown and described in detail to illustrate the application of the principles thereof, it will be understood that the invention may be otherwise embodied without departing from such principles.

What is claimed is:

A mounting for elongated tubes comprising, in combination, a box shaped bracket having a pair of parallel walls; means on one of said walls adapted to interlock the bracket to a supporting plate; an elongated slot in the opposite wall; a substantially cylindrical socket having a pair of spring fingers projecting radially in opposite directions from one end, said socket being interlocked with said bracket by inserting said fingers in the slot and turning the socket so that said fingers extend transversely of the slot and engage such opposite wall; a tube mounting post having a substantially cylindrical shank receivable in said socket; longitudinal fluting on said shank; and means on said socket effective to engage said fluting to prevent relative rotation of said post and socket.

JOSEPH BAUM.

REFERENCES CITED

The following references are of record in the file of this patent:

UNITED STATES PATENTS

| Number | Name | Date |
|---|---|---|
| 258,061 | Haviland | May 16, 1882 |
| 562,528 | Hokanson | June 23, 1896 |
| 906,543 | Mitchell | Dec. 15, 1908 |
| 1,811,211 | Peirce, Jr. | June 23, 1931 |
| 1,867,206 | Brady | July 12, 1932 |
| 2,138,013 | Perr | Nov. 29, 1938 |
| 2,343,691 | Miller | Mar. 7, 1944 |
| 2,509,445 | Motis | May 30, 1950 |